Dec. 28, 1937.  C. W. LUCEK  2,103,476

TELEGRAPH TEST BOARD CIRCUIT

Filed June 6, 1936   2 Sheets—Sheet 1

INVENTOR
C.W. LUCEK
BY
J. W. Schmied
ATTORNEY

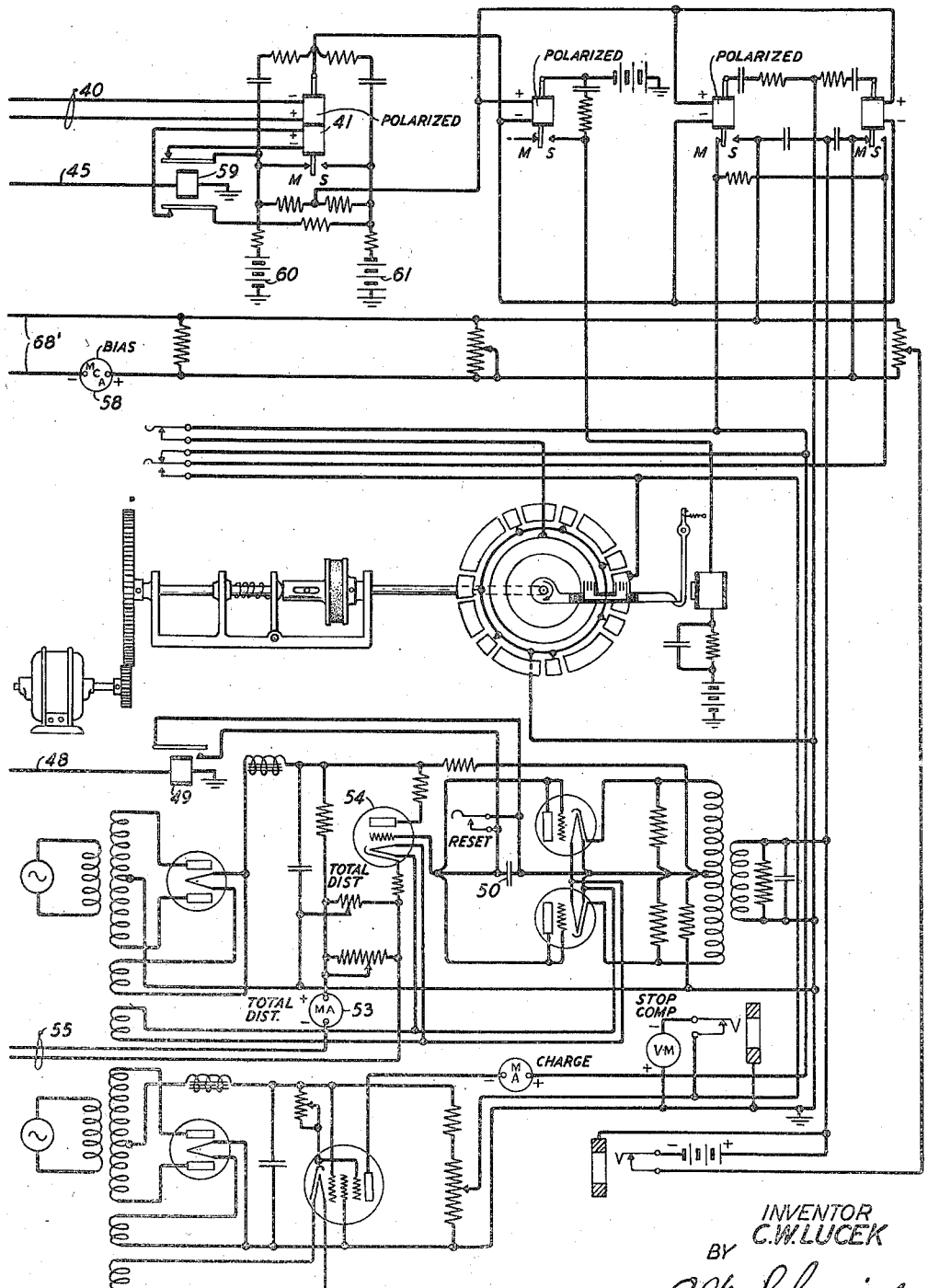

Patented Dec. 28, 1937

2,103,476

UNITED STATES PATENT OFFICE 2,103,476

TELEGRAPH TEST BOARD CIRCUIT

Charles W. Lucek, Forest Hills, N. Y., assignor to Bell Telephone Laboratories, Incorporated, New York, N. Y., a corporation of New York Application June 6, 1936, Serial No. 83,830

10 Claims. (Cl. 178—69)

This invention relates to multiple switchboards and more particularly to multiple circuits appearing at each of several positions on a telegraph switchboard or test board.

An object of the invention is to connect any one of a plurality of transmission circuits through any one of several positions of a switchboard to a transmission measuring circuit.

According to the present invention the switchboard is equipped with a distortion measuring circuit having at each position an appearance in the form of a signal lamp for indicating busy conditions of the circuit, a spring jack whereby a connection to the circuit may be made and a pair of meters for respectively indicating total distortion and bias in signals received over any one of a plurality of transmission circuits. Cord, or link, circuits are also provided at each position for connecting any one of a plurality of transmission circuits over which it is desired to make tests for total distortion and bias, to measuring circuits providing, of course, that the measuring circuit is not in use at the time. The measuring circuit is provided with a sequence arrangement that prevents it from being connected to more than one transmission circuit at a time. The measuring circuit comprises a relay associated with each of the spring jack appearances and two other relays common to all the spring jack appearances. Each of the first-mentioned relays and the contacts of the associated spring jacks form part of a double chain circuit for sequence purposes. One chain circuit furnishing battery begins at the back contact of the relay individual to the lowest numbered position of the switchboard and extends through the back contacts of all the relays individual to the other positions in series. Ground potential is furnished through the winding of one of the relays common to all the spring jack appearances, while the other chain circuit which extends to all the spring jacks beginning at the highest numbered position and ending at the spring jack in the lowest numbered position. The connection of a cord circuit to any spring jack removes the ground potential through the winding of the common relay from all the spring jacks at the other lower numbered position and if the measuring circuit is not in use, causes a relay individual to the position at which the cord circuit is connected to operate in series with the common relay from battery at one end of the chain to ground at the other end of the other chain. The operation of a relay individual to the position at which the cord circuit is connected (1) connects the tip and sleeve of the spring jack through the contact of the other common relay to the measuring circuit; (2) removes battery from the chain circuit extending through the contacts of the relay individual to the highest numbered position; (3) opens the circuit path extending to the signal lamp associated with the spring jack to which the cord circuit is connected thereby preventing the lamp from lighting; and (4) closes a sublocking circuit under control of the operator's spring jack. The operation of the first-mentioned common relay in series with the relay individual to the operator's spring jack causes the operation of the second mentioned common relay, which relay upon operating connects the measuring circuit to the tip and sleeve spring of the operator's spring jack and at the same time furnishes battery to light the signal lamp at all the positions of the switchboard other than that at which the operator's spring jack is located thereby indicating to the operators at the other positions that the measuring circuit is busy.

A feature is to give a busy indication at all positions of a switchboard other than the one to which a transmission circuit is connected to the measuring circuit.

Another feature is to permit exclusive use of the measuring circuit at one position of the switchboard at a time without interference from subsequent connections of other transmission circuits at the other positions at the time the measuring circuit is in use.

Another feature is to cause one transmission circuit only to obtain the use of the measuring circuit at a time when simultaneous attempts are made at different positions of the switchboard to connect two transmission circuits to the measuring circuit.

Another feature is to indicate by means of meters at any position of the switchboard the total distortion and bias present in signals received over the transmission circuit that is connected to the measuring circuit.

Another feature is to permit restoration of the measuring circuit to normal at any one position of the switchboard without breaking the connection between the transmission circuit and the measuring circuit.

Another feature is to adapt the measuring circuit for connection at any one position of the switchboard to transmission circuits arranged to transmit polar or neutral signals.

A more complete understanding of the invention may be obtained from the accompanying drawings in which:

Fig. 2 shows the circuit of a telegraph transmission measuring set arranged according to this invention to cooperate with the circuits of Fig. 1.

Figure 1:
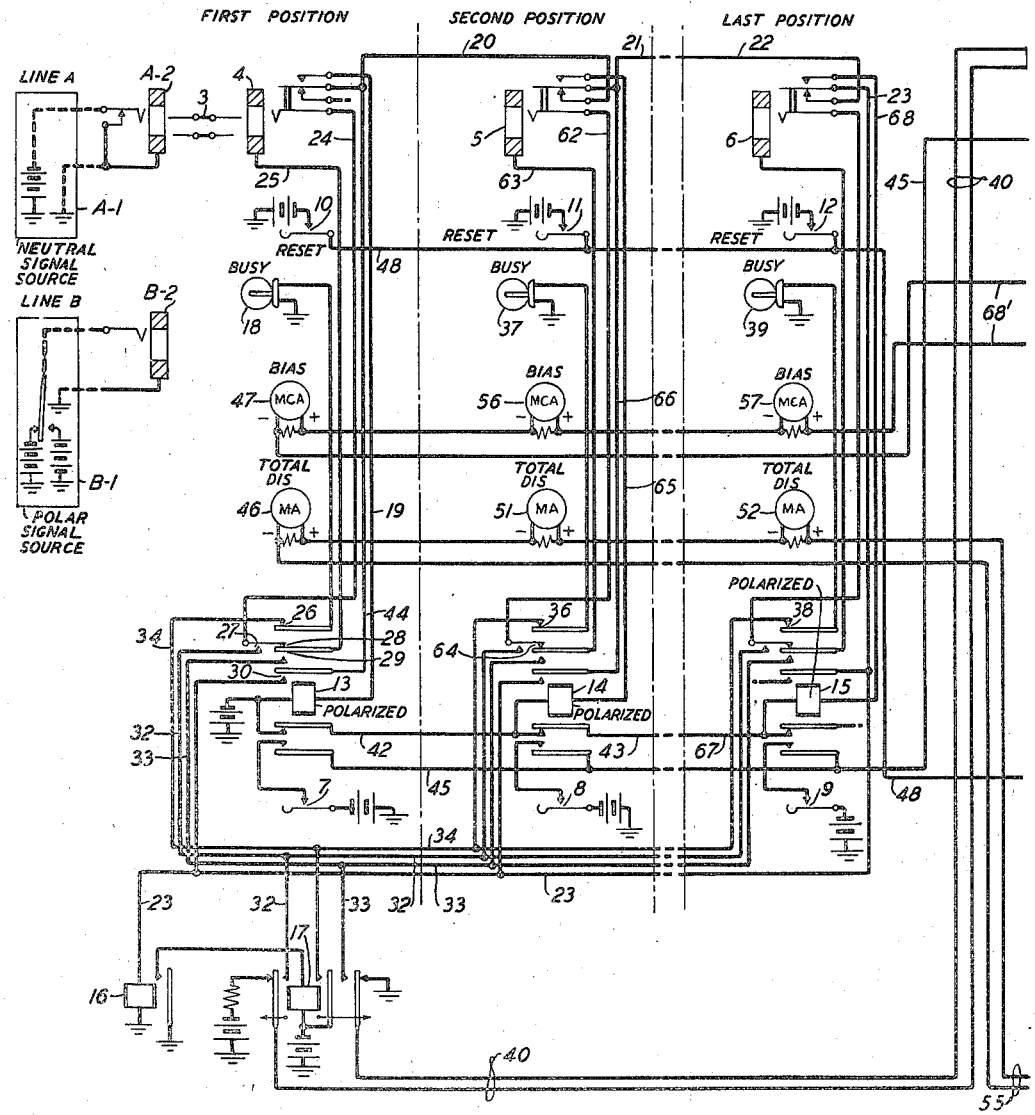
Fig. 1 shows a circuit arrangement of the invention adapted for use at a plurality of positions of a telegraph switchboard or test board in cooperation with a telegraph transmission measuring set.

Referring to Fig. 1 the apparatus of this invention necessary for the first, second and last positions of a telegraph switchboard or test board is shown with the apparatus in intermediate positions between the second and last omitted, the omission being indicated by dotted lines. In order to test a telegraph line A—1, which is connected at one end to a source of neutral signals and at the other end to a jack A—2 appearing at the first position of the switchboard a cord 3 is used to patch jack A—2 to jack 4. Similarly, the same line multipled to other positions, and other lines, not shown, appearing at the other positions of the switchboard, may be patched to other jacks as jacks 5 and 6, at the second and last positions, respectively. At each position are meters, connected to the transmission measuring set, which indicate the "total distortion" and "bias", respectively, of the signals being transmitted over the line under test. Also at each position is a busy lamp to indicate to the attendant whether or not the transmission measuring set is in use, a key 7, 8, or 9 to prepare the measuring set for the reception of polar signals, and a reset key, 10, 11, or 12, which is used to obtain a zero reading on the total distortion meter, each time before making a measurement.

Associated with each jack 4, 5, 6, is a relay 13, 14, 15 and common to all the jacks are relays 16 and 17. The aforesaid relays are arranged in accordance with this invention to cooperate with the jacks and the measuring set so that only one line can be connected at a time to the measuring set. Also, in accordance with another feature, when one line is plugged into a jack while the measuring set is being used with another line, the first mentioned line will be automatically connected to the set when the plug connecting the second mentioned line is withdrawn. In accordance with still another feature, whenever a line is connected to the test set by the positional relay 13, 14 or 15, either immediately, when the test set is not already in use, or after a period of waiting when the set is already in use, said connection is made without any momentary opening of the circuit as will be described hereinafter.

Referring to Fig. 2, this corresponds essentially with Fig. 1, of a patent application of Frank A. Cowan, Serial No. 29,569, filed July 2, 1935 and which describes a telegraph transmission measuring set. The circuit of Fig. 1 of the Cowan disclosure is not arranged to be remotely controlled from, or to cooperate with a multiposition telegraph switchboard or test board, but otherwise does not differ from Fig. 2 of this present disclosure. Accordingly, for a detailed description of the operation of Figure 2, which is not considered necessary to give here, reference should be had to the patent application of Cowan, supra.

A more detailed understanding of the invention may be obtained from the following description, when read in connection with the accompanying drawings.

Let it be assumed that the operator in control of the first position of the telegraph switchboard or test board desires to measure the transmission characteristics of line A—1 which is terminated on the continuity jack A—2. Assuming now that the busy lamp 18 is not lighted, indicating that the transmission measuring set is not being used at some other position, and that jack A—2 is patched by cord 3 to jack 4, a circuit is now closed for operating relay 13 which may be traced from battery through the winding of relay 13, over conductor 19, through operated front contacts of jack 4, over conductor 20, normally closed contacts of jack 5, over conductor 21, through normally closed contacts of jacks, not shown, of positions between the second and last, over conductor 22 and through normally closed contacts of jack 6, over conductor 23 and through winding of relay 16 to ground. Relay 13 in operating breaks the normal connection between line conductors 24 and 25, by opening its contacts 28, and connects conductor 24 to conductor 32 by means of contacts 27, and conductor 25 to conductor 33 by means of contacts 29. Relay 13 in operating also, with its contacts 26, disconnects busy lamp 18 of the first position from conductor 34, thereby preventing this lamp from lighting when conductor 34 is connected to battery as will be hereinafter described. Relay 16 also operates in series with relay 13 in the circuit before traced and in turn operates relay 17 through an obvious circuit. Relay 17 in operating connects battery with its right inner contacts, to conductor 34, thereby closing through contacts 36 of relay 14 a circuit to ground through busy lamp 37, a similar circuit through contacts 38 of relay 15 to ground through busy lamp 39 and similar circuits through busy lamps at the intervening positions, not shown, all of which lamps are lighted, indicating to the operators at the associated positions that the transmission measuring set is busy. Relay 17, in operating also transfers conductors 40 from their normal connection with battery and ground to conductors 32 and 33, thereby completing the connection of the conductors of line A—1 to the upper winding of polarized relay 41 of Fig. 2, and maintaining the continuity of the telegraph line. Relay 13 in operating also disconnects battery with its lower inner break contacts from conductor 42 and the winding of relay 14 of the second position. This also removes battery from conductor 43, which is connected to the lower inner contacts of relay 14, and also from the extension of this conductor to the winding of relay 15 of the last position, through the lower inner break contacts of similar relays, not shown, intermediate between relays 14 and 15. Relay 13 in operating also closes a locking circuit for itself from battery through the winding of relay 13, over conductor 19 through operated front contacts of jack 4, over conductor 44, through upper contacts 30 and winding of relay 16 to ground. Relay 13 also, with its lower outer contacts, connects the contacts of polar key 7 to conductor 45.

The operator in control of the first position is now ready to test the transmission characteristics of line 1 using the apparatus of Fig. 2, a detailed description of which may be obtained as before stated, from the Cowan application to which reference has been made. Assuming that the circuit of line A—1 is transmitting neutral signals, the key 7 used only for polar signals, will not now be operated. Relay 41 will now respond to the unidirectional open and closed current pulses through its upper winding. Meter 46 will indicate the total distortion and meter 47 the bias of the incoming signals. Before recording any observations, however, reset key 10, should be momentarily operated to close a circuit from battery through the contacts of key 10, over conductor 48, and through the winding of relay 49 to ground. Relay 49 operates and momentarily short circuits condenser 50, through an obvious circuit to assure a zero reading of total distortion meter 46 before it is required to measure the total distortion of the signals in line A—1. Meter 46 is in series with total distortion meters 51 and 52, similar meters at intervening positions, not shown, and over conductors 55 with meter 53 of the test set and the plate-cathode circuit of ionic tube 54. Bias meter 47 aforesaid is in series with bias meters 56 and 57 at the second and last positions, respectively, in series with bias meters at intervening positions, not shown, and over conductors 68 with bias meter 58 and its associated circuit of the test set.

The operation of the invention for testing telegraph line B—1 when it is transmitting from a source of polar signals will now be discussed. Marking impulses are represented by a flow of current in one direction and spacing impulses by a flow in the opposite direction. To prepare the test circuit for this condition, after connection has been established by patching jack B—2 to jack 4 as before described, polar locking key 7 is operated. A circuit is now closed from battery through the contacts of key 7, lower outer operated contacts of relay 13, over conductor 45 and through the winding of relay 59 to ground. Relay 59 operates and disconnects with its upper and lower break contacts the lower or biasing winding of relay 41 from the circuit of batteries 60 and 61. The armature of polarized relay 41 now operates to its spacing or marking contacts in response to the reversal of current through its upper winding. Meters 46 and 47 will now indicate total distortion and bias, respectively, as in the case of the line operating on a neutral basis.

The feature of the invention, whereby the possibility of a simultaneous connection of two or more lines to the test circuit is avoided, without causing a momentary opening of the circuit of any line, which would thereby cause a mutilation of the signals being transmitted, will now be described.

Let it be assumed now that the line A—1 has been patched to jack 4 of the first position and that relay 13 has operated and locked up as hereinbefore described. If now an operator at some higher numbered position, the second position for instance, should attempt to connect a line by inserting a plug, not shown, into jack 5, relay 14 does not operate, since battery has been removed from conductor 42, by the previous operation of relay 13. Since the tip and sleeve conductors of jack 5, conductors 62 and 63 respectively, are connected together by the normally closed contacts 64 of relay 14 there is no opening of the line plugged into jack 5. Suppose, however, that the operator of the second position inserts the plug of the patching cord into jack 5 before the plug of the cord 3 is inserted in jack 4. Under this condition relay 14 of the second position operates in a circuit from battery through the lower inner break contacts of relay 13, over conductor 42, through winding of relay 14, over conductor 65, through operated front contacts of jack 5, thence over conductor 21, and through the circuit before traced to ground through the winding of relay 16. Relay 14 now locks over conductor 65, through operated front contacts of jack 5, over conductor 66, and upper innermost front contacts of relay 14, to the ground on conductor 23. If the operator of the first position should now plug into jack 4, relay 13 cannot operate, since the previous operation of the contacts of jack 5 has removed ground from conductor 20.

It is evident, therefore, that a positional relay of an intermediate position between the first and last, such as relay 14 of the second position, is prevented from operating by the absence of battery from its winding when a relay of a lower numbered position has previously operated. When a line has been previously plugged in at a higher numbered position, then the said intermediate relay 14 fails to operate because of the absence of ground due to the operation of the jack contacts at the said higher numbered position. It follows, accordingly, that no more than one positional relay can be operated at a time, even if the operators plug in simultaneously at several positions.

The operation of the system will now be discussed in relation to the feature, hereinbefore mentioned, whereby if the test set in use as indicated by the lighting of the busy lamps at all of the positions except the busy position, it is possible to obtain control of the test set automatically when this is released.

To illustrate, let it be assumed that the test set is being used at the second position, that is, that the plug of a patching cord, not shown, has been inserted into jack 5. Relay 14 is accordingly, locked operated, over the circuit before traced, to ground through the winding of relay 16. Suppose now that the plug of cord 3 be subsequently inserted, into jack 4 of the first position, and that the plug of a similar cord, not shown, be inserted into jack 6 of the last, or highest numbered position.

Under this condition, relay 13 of the first position cannot operate, since ground on conductor 20 has been removed by the previous operation of the transfer springs of jack 5; relay 15 of the last position also does not operate since there is no battery on conductor 67 due to the previous opening of the lower inner break contacts of relay 14. Let it be assumed now that the operator at the second position having completed the test of the line plugged in at that position, removes the plug of the patching cord. Relay 14 now releases due to the opening of its locking circuit, when the springs of jack 5 resume their normal position, and in releasing connects battery, with its lower inner contacts to conductor 43 and thence through corresponding break contacts of intervening relays not shown, to conductor 67. Relay 15 therefore operates from said battery on conductor 67 through its winding over conductor 68 and the operated front contacts of jack 6 over conductor 23 and through the winding of the common relay 16 to ground. Relay 13 of the first position, however, does not operate, since there is still no ground on conductor 20, due to the operated condition of the springs of jack 6 of the last position. By the operation of relay 15 use of the test set is thus assigned to the last position at which position the busy lamp 39 is extinguished, due to the opening of the contacts 38 of relay 15, which is an indication to the waiting operator that the test may now proceed.

When the test at the last position has been completed and the plug of the patching cord has been withdrawn from jack 6, relay 13 of the first position then operates due to the reconnection of ground through the winding of relay 16 to conductor 20.

From the discussion hereinbefore given it is seen, therefore, that when the test set is being used at one of the positions, and that lines are plugged into jacks at other positions, when the test set is released it is assigned to the waiting positions in the order of their numbers, the higher numbers first, the lower numbers last.

Another important feature of the invention which has been mentioned hereinbefore should now be discussed, namely, that arrangement whereby working telegraph lines can be connected directly to the test set if this is not in use, or if in use then automatically thereto as soon as the set is released, without causing a momentary opening of the telegraph circuit. In connecting a line for test it is essential in order to maintain line continuity that one plug of the patching cord be inserted into the test jack first, and then the other plug into the line jack, which is of the so-called continuity type designed to keep the line conductors closed, until these are connected to the corresponding conductors of the entering plug.

Assuming that one plug of cord 3 is inserted into jack 4 and if relay 13 does not operate immediately, the tip and sleeve conductors 24 and 25 are connected together through the normally closed contacts 28 of relay 13. If relay 13 operates at once due to the test set being immediately available, then by the time the other end of the patching card is inserted into the tool line to be tested the circuit is maintained through the operated contacts 27 and 29, over conductors 32 and 33 through operated left-hand front contacts, and right-hand outer front contacts of relay 17, over conductors 40 and through upper winding of relay 41. If the test set is not available, relay 13 operates when the sequence circuit allots the use of the test set to the first position. In this case the circuit is maintained without interruption since in the first place relay 17 is designed to have slow-releasing characteristics thereby keeping the left-hand front and the right-hand outer front contacts of relay 17 closed and since contacts 27, 28 and 29 of relay 13 are designed so that contacts 28 do not break until contacts 27 and 29 are both closed. After the test is completed, the plug of the patching cord, which is inserted in the line jack should be removed first, so that the continuity contacts of the line jack may maintain the line closed.

It is to be understood that although the invention has been described around certain desirable embodiments thereof, it may be also embodied in various other forms without departing from the spirit of the invention, as defined by the appended claims.

What is claimed is:

1. In an exchange for switching connections between electrical circuits, a switchboard comprising a plurality of sections, a plurality of transmission circuits terminating at a plurality of sections of said switchboard, a test circuit common to a plurality of sections of said switchboard, manually operated means at each of said sections, a chain circuit comprising two chain paths normally open and controlled by any one of said manually operated means, a relay responsive to the operation of each of said manually operated means, a second relay responsive to the operation of any one of said manually operated means, a link circuit at each of said sections for interconnecting any one of said transmission circuits and any one of said manually operated means whereby said chain circuit operates to include certain sections of said chain path, a third relay responsive to the operation of the second mentioned relay to connect said one of said transmission circuits to said test circuit.

2. In an exchange for switching connections between electrical circuits, a multisection switchboard, a plurality of transmission circuits terminating in multiple in the sections of said switchboard, a test circuit common to a plurality of sections of said switchboard, manually operated means at each of said sections, a relay and an indicating element associated with each of said means, a chain circuit comprising two chain paths normally open and controllable by any one of said manually operated means, a second relay responsive to the operation of any one of said manually operated means, a link circuit at each of the sections of said switchboard for interconnecting any one of said transmission circuits and any one of said manually operated means whereby said chain circuit operates to include certain sections of said chain path, a third relay responsive to the operation of said second mentioned relay to connect one of said transmission circuits to said test circuit and to operate said indicating element associated with each of the manually operated means in normal position.

3. In an exchange for switching connections between electrical circuits, a switchboard comprising a plurality of sections, a plurality of transmission circuits, a plurality of spring jacks whereat said transmission circuits respectively terminate in each of said sections, a test circuit common to said plurality of sections and having a plurality of paths each being individual to one of said sections, a plurality of connection spring jacks respectively mounted in said sections and terminating said paths, a link circuit at each of said sections for interconnecting each of said terminating spring jacks and said connection spring jack, a relay at each of said sections comprising means for preventing two or more link circuits at different sections from being effectively connected to two or more transmission circuits simultaneously, and other means on said relay for conditioning each of the other of said link circuits simultaneously connected to said two or more transmission circuits for subsequently effective connections, in turn, after said established effective connection is open.

4. In an exchange for switching connections between electrical circuits, according to claim 3, wherein said relay at each of said sections comprises other means for maintaining the continuity of circuit when said test circuit is connected and disconnected to each of the two or more transmission circuits simultaneously selected or tested, said transmission circuits being effectively connected in a definite sequence.

5. In an exchange for switching connections between electrical circuits, according to claim 3, wherein said relay at each of said sections comprises still other means for indicating at each of the other said sections that said test circuit is busy.

6. In an exchange for switching connections between electrical circuits, a switchboard comprising a plurality of sections, a plurality of signaling current transmission circuits terminating at each of said sections, a test circuit connected in common to said sections and having a plurality of parallel paths each terminating in one of said sections, a test set in said test circuit having a plurality of current measuring circuits, a plurality of current measuring devices located at each of said sections and at said test set, the devices at each of said sections and said test set being respectively connected in said current measuring circuit, and signal responsive means in said test circuit for operating said measuring devices when one of said signaling current transmission circuits is connected to said test circuit.

7. In an exchange for switching connections between electrical circuits, according to claim 6, wherein one of said current measuring devices at each of said sections comprises a control means for restoring it to normal after each measurement.

8. In an exchange for switching connections between electrical circuits, a switchboard comprising a plurality of sections, a plurality of signaling current transmission circuits, a source of neutral signals and a source of polar signals connected to said transmission circuits, a test circuit connected in common to said transmission circuits and having a plurality of parallel paths each terminating at one of said sections, a test set in said test circuit, a relay at each of said sections arranged in each of said parallel paths, another relay in said test set, and two-position switching means at each of said sections arranged when operated to cooperate with one of the first-mentioned relays and said other relay to prepare said test set to receive polar signals when said switching means is in one position and to receive neutral signals when said switching means is in the other position.

9. A plurality of lines to be tested terminating at a central point, a test circuit, a plurality of connectors for connecting said lines to said test circuit, means for connecting more than one of said lines individually each to one of said connectors simultaneously, means actuated by applying said means to said connectors whereby but one only of said lines is operatively associated with said test circuit at a time.

10. A plurality of lines to be tested terminating at a central point, a test circuit for said lines, a plurality of connectors for connecting said lines to said test circuit, means for connecting more than one of said lines individually each to one of said connectors simultaneously, means actuated by applying said means to said connectors whereby but one only of said lines is operatively associated with said test circuit at a time, means whereby said other lines connected to a connector are kept uninterruptedly closed at said central point, and means whereby withdrawal of any one of said means from its connector operatively associates another one only of said connected lines to said test circuit.

CHARLES W. LUCEK.